United States Patent [19]

Edwards

[11] Patent Number: 4,597,905

[45] Date of Patent: Jul. 1, 1986

[54] METHOD FOR ACYLATING AMINOANTHRAQUINONES

[75] Inventor: Brooks Edwards, Cambridge, Mass.

[73] Assignee: Polaroid Corporation, Cambridge, Mass.

[21] Appl. No.: 644,914

[22] Filed: Aug. 27, 1984

[51] Int. Cl.$^4$ ............................................ C07C 103/75
[52] U.S. Cl. ...................................... 260/377; 546/262
[58] Field of Search .......................... 260/377; 546/262

[56] References Cited

U.S. PATENT DOCUMENTS

| | | | |
|---|---|---|---|
| 938,616 | 11/1909 | Thomaschewski | 260/377 |
| 938,618 | 11/1909 | Deinet | 260/377 |
| 957,041 | 5/1910 | Deinet | 260/377 |
| 2,245,535 | 6/1941 | Stallmann et al. | 260/377 |
| 2,794,032 | 5/1957 | Frey | 260/377 |
| 3,719,489 | 3/1973 | Cieciuch et al. | 96/29 D |

OTHER PUBLICATIONS

E. de Barry Barnett, *Anthracene and Anthraquinone*, pp. 212–217, 1921.

Burstall, *J.C.S., Chem. Comm.*, No. 1, 1965, p. 15 "A Facile Transacylation Reaction in the Anthracene Series".

Setsune et al., *J.C.S., Chem. Comm.*, 1982, pp. 1022–1023, "Synthesis and cis-to-trans Isomerization of N,N'-Diacyl Derivatives of Indigotin."

*Primary Examiner*—Glennon H. Hollrah
*Assistant Examiner*—Raymond Covington
*Attorney, Agent, or Firm*—Gaetano D. Maccarone

[57] ABSTRACT

A method for acylating aminoanthraquinone dyes which comprises reducing the dye to the leuco form, reacting the leuco dye with an acylating agent and oxidizing the acylated leuco compound to form the desired acylated dyes. In a preferred embodiment bis 1,4-aminoanthraquinone dyes and bis 1,5,aminoanthraquinones are formylated.

4 Claims, No Drawings

METHOD FOR ACYLATING AMINOANTHRAQUINONES

BACKGROUND OF THE INVENTION

The present application relates to a method for preparing acylated aminoanthraquinone dyes.

U.S. Pat. No. 3,719,489 describes and claims photographic processes employing certain photographically inert compounds which are capable of undergoing cleavage in the presence of the imagewise distribution of silver ions made available during processing of a silver halide emulsion to liberate a reagent, such as, a photographically active reagent or a dye in an imagewise distribution corresponding to that of said silver ions. In one embodiment disclosed therein, color images are produced by using as the photographically inert compounds, color providing compounds which are substantially non-diffusible in the photographic processing composition but capable of undergoing cleavage in the presence of the imagewise distribution of silver ions and/or soluble silver complex made available in the undeveloped and partially developed areas of a silver halide emulsion as a function of development to liberate a more mobile and diffusible color-providing moiety in an imagewise distribution corresponding to the imagewise distribution of said ions and/or said complex. The subsequent formation of a color image is the result of the differential in diffusibility between the parent compound and liberated color-providing moiety whereby the imagewise distribution of the more diffusible color-providing moiety released in the undeveloped and partially developed areas is free to transfer.

Copending application Ser. No. 644,915, filed on even date herewith discloses photographic process for forming a dye image from a substantially colorless precursor which comprises a dye having at least one formylated amino group and which also includes a moiety containing a thiazolidin-2-yl group which upon silver-assisted cleavage initiates a reaction sequence leading to the formation of the image dye. The present application is directed to a method for preparing acylated aminoanthraquinone compounds. The compounds prepared by this method include formylated aminoanthraquinones which are useful as intermediates in the preparation of image dye-providing material suitable for use in such photographic applications.

SUMMARY OF THE INVENTION

It is an object of this invention to provide a method for preparing acylated aminoanthraquinone dyes.

It is another object of the invention to provide a method for formylating aminoanthraquinone dyes.

A further object is to provide such a method wherein the aminoanthraquinone dye is initially reduced to the leuco form.

Still another object is to provide a method for preparing formylated bis 1,4-aminoanthraquinone dyes and bis 1,5-aminoanthraquinone dyes.

BRIEF SUMMARY OF THE INVENTION

These and other objects and advantages are accomplished in accordance with the invention by providing a method which comprises reducing an aminoanthraquinone dye to the leuco form in a solvent, reacting the leuco dye with an acylating agent to form the acylated leuco dye and oxidizing the latter to give the desired acylated aminoanthraquinone dye. In a preferred embodiment the method is used to formylate an aminoanthraquinone dye which has at least one, or preferably two, amino groups to provide compounds which are useful as intermediates in the preparation of image dye-providing materials which are useful in photographic applications.

The method can be carried out with any reducing agent which will provide the desired leuco dye intermediate. The desired leuco dye intermediate is a dihydro form of the anthraquinone which can be readily oxidized back to the anthraquinone dye. Typical suitable reducing agents include zinc and sodium dithionite. The reducing step can be carried out in any suitable solvent such as for example, acetic acid and mixtures of acetic acid and an organic solvent such as dichloromethane. The acylation step may be carried out with any suitable acylating agent such as acid chlorides or anhydrides, e.g., formic anhydride. The acylating agent may be generated in the reaction vessel or in advance of the reaction.

The acylation step can be carried out in any suitable solvent such as methylene chloride. The acylation may be carried out in the presence of a weak base such as pyridine if the acylating agent is stable in the presence of such base. Reoxidation of the acylated leuco compound can be carried out by techniques which are well known in the art such as exposure to air, exposure to air with heating or treatment with an oxidizing agent, e.g., manganese dioxide or the like.

The method of the invention may be illustrated by the following general reaction scheme:

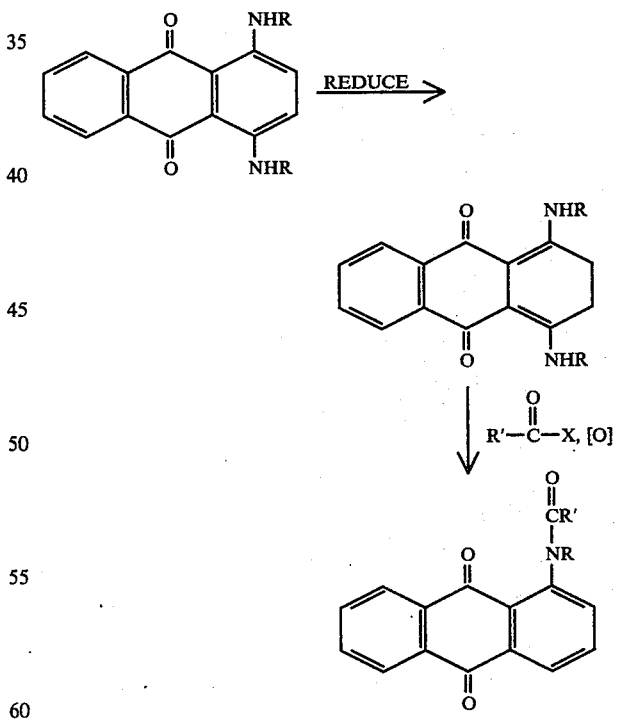

wherein R can be hydrogen, a straight chain aliphatic group such as alkyl; an aliphatic group branched in the α position such as isopropyl; a cyclic aliphatic group such as cyclohexyl; a heterocyclic aliphatic group; or aryl such as phenyl; and R' can be hydrogen, alkyl, preferably having from 1 to 4 carbon atoms, aryl such as phenyl and heteroaryl such as pyridine; and X may be any leaving group such as Cl ⊖, —OCHO⊖, F⊖, —OCOC(CH₃)₃⊖ and the like.

Although the general reaction scheme has been illustrated with respect to an aminoanthraquinone having two amino groups in the 1- and 4-positions it should be noted, as previously mentioned, that the method is applicable to anthraquinones having a single amino group or two or more amino groups and these can be in any of the available positions. Further, although the method can be used to acylate amino groups in any of the available positions, in a preferred embodiment the method is practiced with anthraquinone dyes having one or more amino groups in the α-position(s) (i.e. 1,4,5 and 8 positions) since such aminoanthraquinone dyes cannot conveniently be acylated by other acylation techniques.

According to a preferred embodiment, the method is utilized to formylate bis 1,4-aminoanthraquinone dyes which cannot be conveniently formylated by other conventional formylation techniques.

DESCRIPTION OF THE PREFERRED EMBODIMENTS

The starting materials utilized according to the method are commercially available in some cases and also can be made by reactions which are well known in the art. Generally, the bis 1,4-aminoanthraquinones can be prepared by reacting leucoquinizarin with the appropriate amino compound in the presence of an organic solvent such as dimethylformamide. The leuco dye intermediate may be recovered from the reaction mixture and purified prior to being acylated or the reaction may be carried out without isolating the intermediate.

The invention will be described further in detail with respect to specific preferred embodiments by way of examples, it being understood that these are intended to be illustrative only and the invention is not limited to the materials, process parameters, etc which are recited therein.

EXAMPLE I

Benzyl chloride (104 g, 1.0 m) was added dropwise to a solution of KOH (112 g, 2.0 m) in 100 ml of xylene and 304 g of 1,3-propanediol at 50° C.-60° C. The solution was then heated at 100° C. for 2 hours. Water (400 ml) was added to the cooled solution and the mixture was extracted twice with 600 ml of methylene chloride. The combined methylene chloride extracts were washed three times with 400 ml of water, dried over MgSO₄, filtered and evaporated to a yellow oil which was distilled under vacuum. The 98° C.-106° C. (1.5 mm) fraction was collected to give 88.7 g of 3-benzyloxypropanol.

To a solution of 3-benzyloxylpropanol (9.9 g, 0.06 m) and methylene chloride (120 ml) deaerated with nitrogen, triethylamine (8.4 ml, 0.06 m) was added with stirring. The solution was cooled to −78° C. and methane sulfonyl chloride (4.62 ml, 0.06 m) was added dropwise. The resultant slurry was warmed to 0° C., stirred for two hours, stored overnight at −20° C., then washed with 100 ml of ice water; 100 ml of ice cold 3% HCl; 100 ml of ice cold 1:1 saturated NaHCO₃:water; and water. The methylene chloride layer was dried over Na₂SO₄ and evaporated to give a thick straw colored oil. Drying under high vacuum gave 14.79 g of the methane sulfonate

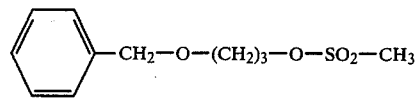

Alaninol (61 ml, 0.0765 m) was added dropwise to a suspension of 50% NaH (3.67 g, 0.0765 m) in 90 ml of tetrahydrofuran and 20 ml of CH₃CN. The mixture was refluxed for 45 minutes with stirring and a solution of methane sulfonate (18.5 g, 0.0758 m) in 15 ml of CH₃CN was added at the reflux temperature. Heating was continued for 2½ hours followed by standing overnight at room temperature. Ethyl ether (200 ml) was added to the solution which was then washed twice with 125 ml of water. The organic solution was then extracted with 150 ml of 5% HCl. The aqueous acid layer was separated, made alkaline with 100 ml of 10% NaOH and extracted twice with 75 ml of ether. The combined ether extracts were dried over Na₂CO₃ and Norit, filtered and evaporated to give 7.8 g (48% yield) of the desired aminoether as a yellow oil, b.p. 132°–134° C. (1.75 mm) of the formula

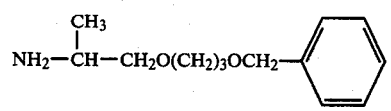

The structure of the compound was determined by a proton NMR spectrum. ¹H NMR (CDCL₃) δ1 (3H,d), 175 (2H,s), 1.8 (2H,q), 3.2 (3H,m), 3.5 (4H,t), 4.4 (2H,s), 7.2 (5H).

The crude aminoether (8.1 g) was dissolved in 60 ml of anhydrous ethanol and treated with 5 ml, of ethanol saturated with HCl gas. Ethanol (35 ml) was then added to the salt solution. 10% Pd/C catalyst (150 mg) was added and the mixture was hydrogenerated in a Parr shaker at 45 lbs. pressure. The catalyst was filtered off and the ethanol evaporated on a rotary evaporator to give the hydrochloride salt of the aminoalcohol.

The salt was dried under vacuum and dissolved in 30 ml of dimethylformamide. NaOCH₃ (2.46 g) and anhydrous methanol (9 ml) were added to the solution with stirring. Argon was used to deaerate the mixture. Leucoquinizarin (2.70 g, 0.0111 m) was added to the suspension and it was heated to 85° C. for about 48 hours and then the mixture was oxidized with air for about 48 hours.

When the oxidized dye reaction mixture was added to 100 ml of 1% HCl the product oiled out. The product was extracted with methylene chloride and the extracts evaporated to a viscous oil which was dried overnight under vacuum at 80° C. The crude dye was chromatographed on a silica gel column to give 2.7 g (52% yield) of the diol dye of the formula

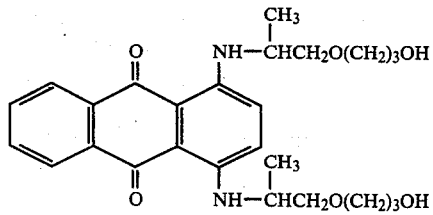

Oxalyl chloride (1.25 ml) was added to 20 ml of dry methylene chloride under argon with stirring. The solution was cooled to −78° C., and dimethylsulfoxide (1.3 ml) added dropwise. After stirring for 5 minutes a solution of the pure diol dye (2.7 g) in 10 ml of dry methylene chloride was added dropwise. The resulting magenta solution was stirred for 20 minutes at −78° C. Triethylamine (6.5 ml) was added dropwise with stirring to produce a suspension which was allowed to warm to 0° C. After 20 minutes methylene chloride (25 ml) was added and the mixture washed with ice water. Additional methylene chloride (25 ml) was added and the mixture washed twice with 50 ml of 1% HCl. The organic phase was dried over $Na_2SO_4$, filtered and dried on a rotary evaporator.

The resultant oil was dissolved in 5 ml absolute ethanol and treated with triethyl orthoformate (5 ml) and 500 mg of toluene sulfonic acid monohydrate. The slightly purple-blue solution was stirred overnight at room temperature. The solution was neutralized with solid $Na_2CO_3$ and an additional ten drops of 10% $Na_2CO_3$ solution was added. The mixture was then stirred for 1 hour, filtered and the solid washed well with ether and dried on a rotary evaporator. The resulting cyan oil was dried under high vacuum at 80° C. overnight to give 3.13 g of a diacetal dye of the formula

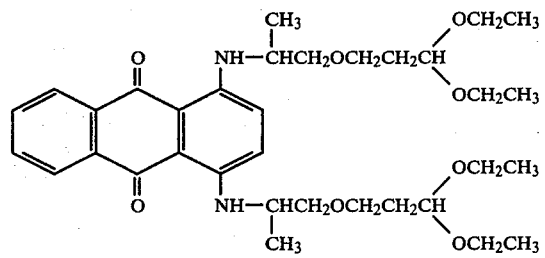

A cyan solution of the illustrated diacetal dye (1 g), 10 ml of ether and 10 ml of acetic acid was cooled to 0° C. and treated with 500 mg of zinc dust with vigorous stirring and shaking. After about 5 minutes the solution was yellow-green. Another 15 ml of ether were added and the solution filtered. A small amount of zinc dust was added and the ether and acetic acid removed under vacuum to give an oil. The oil was dissolved in ether, treated with 1 ml of 10% $Na_2CO_3$ solution, swirled occasionally for one half hour, filtered and evaporated to give the leuco form of the dye, an oil.

Under argon atmosphere a solution of 1,3-dicyclohexylcarbodiimide (2 g) in 15 ml of methylene chloride was cooled to −78° C. and to it there was added 98% formic acid (731 μl) dropwise with stirring. Slight warming caused precipitate formation. The mixture was cooled and stirred for 10 minutes at −78° C. and then filtered into a room temperature solution of the leuco dye in 5 ml of methylene chloride. The reaction mixture was stirred overnight and the crude product was opened to air and chromatographed on silica gel with 15% acetone/85% methylene chloride (v/v) to give 0.64 g of the formylated bis acetal dye.

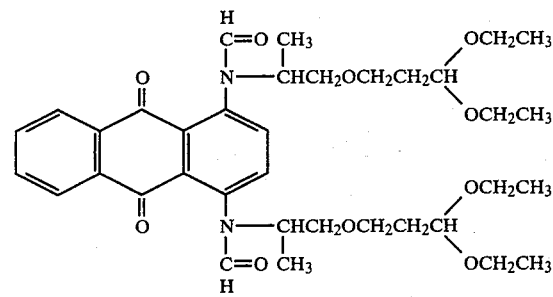

The structure of the formylated dye was confirmed by IR, NMR and mass spectra.

The aminoether intermediate utilized in the preparation of the bis aminoanthiaquinone diacetal dye is disclosed and claimed in copending application Ser. No. 644,911, filed on even date herewith.

EXAMPLE II 1,4-Bis-isopropylaminoanthraquinone (4 g) having the formula

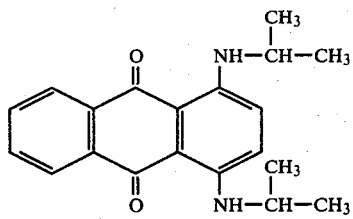

was dissolved in 80 ml of glacial acetic acid with stirring. The reaction flask was purged with nitrogen gas and finely divided zinc dust (2 g) was added followed by vigorous agitation of the mixture. After about one minute the original cyan color had changed to yellow. The solution was swirled for about 4 minutes and then filtered rapidly to remove the zinc dust.

The acetic acid filtrate was slowly diluted with 600 ml of water while swirling the flask. A crystalline solid precipitated out within ten minutes and was collected by filtration. The golden brown solid was dried at 100° C. after washing with water to give 3.4 g of the leuco dye.

The structure was confirmed by IR, NMR and mass spectra.

To generate the formic anhydride, dicyclohexylcarbodiimide (2 g) was added to a flask which had been flushed with argon and 12 ml of methylene chloride (dried over molecular sieves) added with stirring at 0° C. 98% formic acid (731 μl) was added dropwise with argon gas flowing into the flask. A thick suspension formed in the flask after five minutes.

A solution of the leuco dye (0.5 g, 0.0154 m) in 2 ml of methylene chloride was added to a reaction tube which was connected by a needle to the formic anhydride flask and degassed with argon. The argon pressure in the flask was increased and transfer of the formic anhydride to the reaction tube begun. The precipitate remaining in the flask was washed twice with 2 ml of methylene chloride which was forced over to the reaction tube. Argon flow into the flask was continued at a slow rate after transfer was complete to slowly evaporate the methylene chloride. Within 20 minutes a precipitate formed in the yellow orange solution in the reaction tube. The slow argon sweep of the reaction mixture was continued overnight after which the precipitate had dissolved again. Stirring was continued for 24 hours. After 48 hours the solvent was completely swept out and a thick gum remained. A 3:1 (v/v) mixture (20 ml) of ethyl ether and methylene chloride was added to produce an insoluble light yellow precipitate which was then washed with ether. The filtrate was concentrated and chromatographed on silica gel using 20% acetone/80% methylene chloride (v/v) as the elutent. The appropriate fractions were collected and evaporated on a rotary evaporator to give an orange oil and some crystalline material. Carbon tetrachloride was added and the solid filtered off. The carbon tetrachloride solution was evaporated and dried under vacuum to yield an orange foam which was dried further overnight under vacuum to give 0.5 g of an orange solid, the 1,4-bis-N-formyl-isopropylaminoanthraquinone represented by the formula

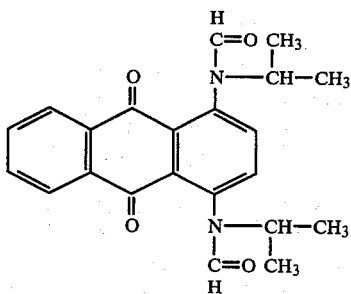

The structure of the product was confirmed by IR, NMR and mass spectra.

EXAMPLE III

The leuco dye of Example II (0.5 g, 0.0015 m) was added to 4 ml of dry pyridine and the suspension stirred at room temperature under argon. Acetyl chloride (220 ml, 0.003 m) was added dropwise to the suspension with vigorous stirring. The suspension darkened and became thicker. Stirring for 1 hour was followed by addition of 50 ml of water to give a dark solid. The solid was collected by filtration and triturated with several portions of ether to give 0.4 g of a yellow solid. The latter was combined with 25 ml of dry dimethylformamide and brought to a boil for 15 minutes. Excess water was added to the cooled reaction mixture and the resulting suspension was extracted with methylene chloride. The organic layer was extracted three times with water solvent was removed after drying over $Na_2SO_4$ to give an orange oil which solidified upon standing for several days. Trituration with ether provided 0.3 g of a yellow solid, the bis 1,4-(N-acetylisopropylamino) anthraquinone, as a mixture of isomers.

The structure of the product was confirmed by IR, NMR and mass spectra.

EXAMPLE IV

2-Bromo-2-nitro-1,3-propanediol (0.02 m) and malonaldehyde bis (dimethyl acetal) (3.3 ml, 0.02 m) were heated, under nitrogen, in an oil bath at 96° C. Toluene sulfonic acid monohydrate (50 mg) was added after the solid melted. The reaction flask was sealed with a rubber septum and returned to the bath. Every 10 minutes the flask was flushed for one minute with a vigorous nitrogen stream to remove methanol. After 2 hours the brown viscous oil was cooled and subsequently solidified. The dark oily solid was treated with 20 ml of boiling hexane. The hot light yellow hexane solution was decanted from an insoluble black tar. Upon cooling to room temperature a slightly yellow solid crystallized out. The solid was collected and washed with hexane to give 5-bromo-5-nitro-2-(2′,2′-dimethoxyethyl)-1,3-dioxane (3.5 g) m.p. 95°–97° C. A sample recrystallized from methanol melted at 96°–98° C.

The structure of the product was confirmed by IR, NMR and mass spectra.

A solution of the nitro dioxane diacetal (1.2 g) in dry ether (30 ml) was added to an addition funnel attached to a flame dried 3 neck flask. The apparatus was also outfitted with a condenser and a nitrogen inlet. Lithium aluminum hydride (460 mg) was added to the previously nitrogen-flushed flask which contained 35 ml of dry ether. The suspension was refluxed for 5 minutes and then cooled to room temperature. The solution of the nitro compound was added to the flask dropwise at a rate which kept the ether refluxing (about twenty minutes). Reflux was continued under external heating for 5 hours. The resulting chalky gray suspension was allowed to stand overnight. Saturated $Na_2SO_4$ solution (2.5 ml) was added with vigorous stirring and cooling. The resulting white solid was collected and washed with ether. The filtrate was evaporated to give 667 mg (87% yield) of the product, 5-amino-2-(2′,2′-dimethoxyethyl)-1,3-dioxane as a mixture of cis and trans isomers. The structure of the crude product was confirmed by thin layer chromatography and IR, NMR and mass spectra.

The amino dioxane acetal (6 g) was added to a Schlenk tube under argon using 10 ml of dimethylformamide to transfer quantitatively. A stream of argon was bubbled through the solution while warming in an oil bath at 75° C. After 5 minutes, leuco quinazarin (1.9 g) was added. The sides of the tube were washed twice with 1 ml of dimethylformamide. The argon deaerating was continued for 5 minutes after which time the tube was sealed with a tight septum cap. Within 2 hours the mixture had changed from a red-brown color to yellow-green. The reaction mixture was stirred for 3 days at 75° C. Air was then bubbled through the mixture for 18 hours. The resulting viscous cyan solution was subsequently diluted with methylene chloride (150 ml) and extracted twice with ice water (50 ml) and twice with ice cold 1% HCl (40 ml). The methylene chloride solution was then treated with $MnO_2$ (1 g) for 40 minutes at room temperature with stirring. Filtration through diatomaceous earth and evaporation of the solvent gave a dark blue solid (4.2 g) which was predominantly a mixture of three dye isomers.

The mixture was chromatographed on Whitman K5F silica gel using a gradient of methylene chloride; 5% acetone:95% methylene chloride (v/v) and 10% acetone:90% methylene chloride. Pure samples of each dye isomer were obtained. Mass spectra of all three isomers showed a parent ion at m/e 586. NMR and IR spectra showed that the Rf 0.69 isomer (silica; 10% acetone:90% methylene chloride) was trans-trans; the Rf 0.55 isomer was cis-trans; and the Rf 0.44 isomer was cis-cis.

In addition to the pure samples, a mixed isomer sample (2.95 g) was obtained from the column and was used in the subsequent formylation reaction.

A solution of the cyan dye (0.346 g, 0.59 m) represented by the formula

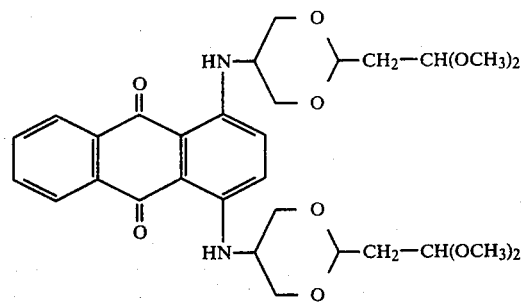

in 10 ml of methylene chloride and 1 ml of acetic acid was cooled in an ice bath and zinc dust (0.759) added with swirling. After 5 minutes the zinc was removed from the resulting yellow solution and washed liberally with methylene chloride. The combined filtrates were extracted with 50 ml of saturated NaHCO$_3$ and dried over Na$_2$CO$_3$ in a nitrogen atmosphere. The solvent was removed by rotary evaporation to give the leuco compound, a yellow-orange foam.

The leuco compound was dissolved in 7 ml of methylene chloride and degassed with argon for 5 minutes. A formic anhydride solution, generated at $-15°$ C. from 1.45 g of 1,3-dicyclohexylcarbodiimide and 530 ul of 98% formic acid in 10 ml of methylene chloride, was cannulated through a filter into the leuco dye solution under argon pressure. The resulting dicyclohexylurea was washed with 4 ml of methylene chloride and the solvent added to the solution. The reaction mixture under argon was allowed to stand overnight then MnO$_2$ (1.25 g) was added and the mixture stirred for 4 hours. The resulting solid was filtered off with a diatomaceous earth pad and the filtrate chromatographed on silica gel under nitrogen pressure using 15% acetone/85% methylene chloride as the eluent. The low R$_f$ yellow product was separated and concentration of the appropriate fractions yielded 250 mg of a yellow orange solid, bis 1,4 [N-formyl(5[2(2:2'-dimethoxyethyl) 1,3 dioxanylamino)]anthraquinone.

The structure of the product was confirmed by IR, NMR and mass spectra.

EXAMPLE V

A solution of an aminoether (16.2 g, 0.0726 m) of the formula

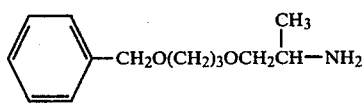

in 50 ml of ethanol was treated with ethanol saturated with HCl gas until the pH was 1 (about 6 ml). 10% Pd/C (200 mg) was added and the material was hydrogenated in a Parr shaker at 40 lbs of pressure. After 30 lbs uptake the catalyst was removed by filtration under nitrogen, washed with ethanol, and the combined ethanol filtrate and washings evaporated to give a light tan gum which was dried under vacuum at 45° C. for 5 hours to give 11.8 g of the hydrochloric acid salt of the amino alcohol.

The amino alcohol salt (11.5 g, 0.068 m) was added to a 20 ml solution of sodium methoxide (3.6 g) in dry dimethylsulfoxide followed by 1,5-dichloroanthraquinone (3.0 g, 0.0108 m). The mixture was heated to 105° C. under nitrogen with stirring for 72 hours. Methylene chloride (200 ml) was added to the cooled reaction mixture and the solution was washed three times with 200 ml of water, with 200 ml of 5% HCl, and finally 100 ml of water. The methyl chloride layer was separated and dried over MgSO$_4$, filtered, and evaporated to a magenta solid. The dried solid was dissolved in methylene chloride and chromatographed on a silica gel column with 10% acetone/90% methylene chloride (v/v) eluent to give 2.3 g (45% yield) of a magenta solid

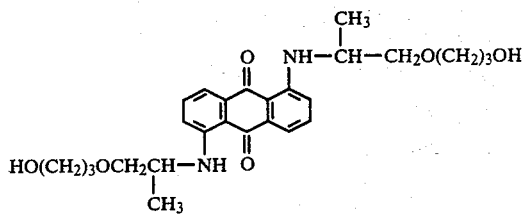

λ max (meth. cell.) 520 nm, ε = 14,100.

A solution of dimethylsulfoxide (0.270 ml, 0.00381 m) in dry methylene chloride (8 ml) was cooled to $-70°$ C. in an acetone/dry ice bath. Oxalyl chloride (0.278 ml, 0.00319 m) was added from a syringe with stirring for 5 minutes. A solution of the antraquinone dye (0.6 g, 0.00127 m) in 6 ml of dry methylene chloride was added from a syringe and the mixture stirred for 25 minutes. Triethylamine (1.06 ml, 0.00636 m) was added and the mixture stirred for 20 minutes. The reaction was allowed to warm to 10° C. during 45 minutes and 50 ml of methylene chloride was added. The reaction mixture was poured into 150 ml of methylene chloride, and the methylene chloride solution washed with 100 ml of water, twice with 100 ml of 1% HCl and then with 100 ml of water. The methylene chloride phase was separated, dried over MgSO$_4$, filtered and evaporated a magenta glass. The product was chromatographed on a silica gel column from methylene chloride and then 2% acetone/methylene chloride as eluents to give 0.32 g (54% yield) of the bis aldehyde dye

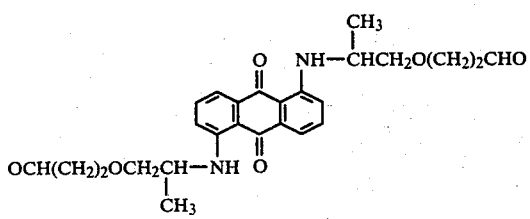

The bis aldehyde dye (0.265 g, 0.000568 m) was dissolved under nitrogen in 5 ml of methylene chloride and treated with 0.354 g (0.00113 m) of an aminoethanethiol of the formula

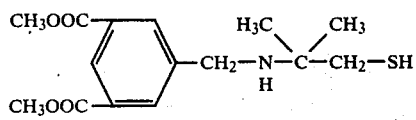

which was obtained from the HCl salt. The reaction mixture was stirred for four hours, 32 μl of acetic acid added and stirring continued overnight. MgSO$_4$ (100 mg) was added and stirring continued for 6 hours. The reaction mixture was diluted with 20 ml of methylene chloride and filtered. The MgSO4 was washed with 30 ml of methylene chloride. The combined filtrates were washed with 50 ml of water, dried with MgSO4, filtered and evaporated to give a magenta glass. The magenta glass was dissolved in 10 ml of methylene chloride and chromatographed on a silica gel column with 30% acetate/hexane (v/v) eluent to give 0.447 g (75% yield) of the aminoanthraquinone of the formula

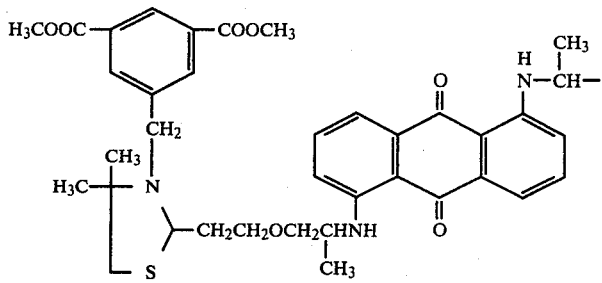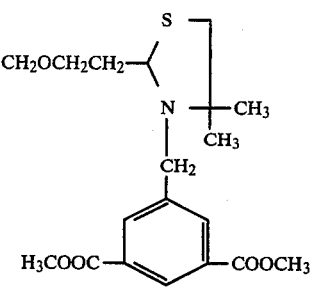

λ max (meth. cell.) 520 nm, ε=13,400; 550 nm, ε=12,000.

The aminoanthraquinone (0.6 g, 0.000569 m) was dissolved in 10 ml of dry methylene chloride and zinc dust (0.4 g) added. The mixture was purged with nitrogen, cooled to −5° C. in an ice bath and k98% formic cid (0.343 ml) added from a syringe. The mixture was stirred for one half hour at −5° C. Under rapid flow of nitrogen additional zinc dust (0.5 g) was added. After 10 minutes the mixture turned an orange color. The mixture was cooled to −60° C. in an acetone/dry ice bath and a solution of 1.8 g (0.0091 m) of 1,3-dicyclohexyl-carbodiimide in 12 ml of dry methylene chloride added from a syringe. The mixture was allowed to stir at −50° C. for three hours and then overnight at room temperature. Methylene chloride (320 ml) was added and the zinc and precipitated solid filtered off and washed with 50 ml of methylene chloride. The combined methylene chloride fractions were washed with saturated NHCO3 solution then with water, dried and evaporated to a glassy residue. The crude product was dissolved in 30 ml of carbon tetrachloride, cooled to 0° C. and the precipitate filtered off. The carbon tetrachloride solution was chromatographed on a silica gel column, eluted first with 30% ethyl acetate/70% hexane (v/v), then with 50% ethyl acetate/50% hexane (v/v) and finally with 80% ethyl acetate/20% hexane (v/v) to give 0.48 g (76% yield) of a yellow glass, the formulated anthraquinone bis thiazolidine ester. λ max 230 nm, ε=40,000; 280 nm, ε=10,000(s); 290 nm, ε=8200(s).

The formylated anthraquinone thiazolidine ester (0.35 g, 0.0003155 m) was dissolved in 4 ml of CH3CN and 2 ml of methanol, cooled to 5° C. 0.7 ml of 0.5N NaOH was added dropwise and the solution stirred at 5° C. for 4 hours. The solution was refrigerated overnight. An additional 0.7 ml of 1N NaOH was added and the solution stirred for 4 hours at 5° C. A further 0.7 ml of 1N NaOH was added and the solution stirred at 5° C. for 4 hours. Water (20 ml) was added and the solution filtered. The filtrate was acidified to pH 4 with 1N HCl. A pink precipitate formed. Water (50 ml) was added and the solution extracted four times with 75 ml of ethyl acetate. The ethyl acetate extracts were dried over MgSO4, filtered and evaporated to a pinkish solid. The crude product was dissolved in ethyl acetate and precipitated with hexane to give about 0.125 g of a pink solid. Evaporation of the hexane gave about 100 mg of a redder material. A mass spectrum showed the product was the diacid mixed with mono ester and bis ester. λ max 296 nm, ε=76,000; 320 nm, ε=4,000.

The aminoethanethiol intermediate used in the synthesis is disclosed and claimed in copending application Ser. No. 644,913, filed on even date herewith.

Although the invention has been described with respect to specific preferred embodiments it is not intended to be limited thereto but rather those skilled in the art will recognize the modifications and variations may be made therein which are within the spirit of the invention and the scope of the appended claims.

What is claimed is:

1. A method for forming an acylated aminoanthraquinone dye comprising:
    reducing an aminoanthraquinone dye represented by the formula

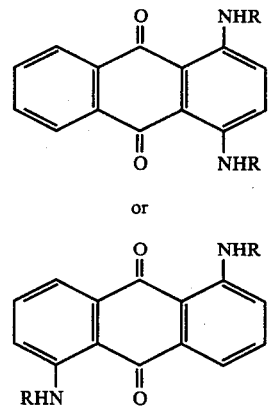

wherein
    R is an aliphatic group or an aryl group to form a leuco dye intermediate,
    reacting said leuco dye intermediate with an acylating agent to form an acylated leuco dye, and
    oxidizing said acylated leuco dye to give an acylated anthraquionone dye.

2. The method as defined in claim 1 wherein said acylating agent is formic anhydride.

3. The method as defined in claim 1 wherein said acylating agent includes a formyl group.

4. The method as defined in claim 1 wherein said acylating agent includes a

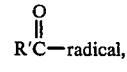

where R' is hydrogen, alkyl, phenyl or pyridyl.

* * * * *